United States Patent
Lo et al.

(10) Patent No.: US 8,408,231 B2
(45) Date of Patent: Apr. 2, 2013

(54) PRESSURE BALANCE VALVE

(75) Inventors: Tsungyi Lo, Taichung (TW); Mingchia Wu, Taichung (TW); Weilong Chen, Wufong Township, Taichung County (TW)

(73) Assignee: Globe Union Industrial Corp., Taichung (TW)

( * ) Notice: Subject to any disclaimer, the term of this patent is extended or adjusted under 35 U.S.C. 154(b) by 282 days.

(21) Appl. No.: 12/984,548

(22) Filed: Jan. 4, 2011

(65) Prior Publication Data

US 2012/0167999 A1    Jul. 5, 2012

(51) Int. Cl.
*G05D 11/00*    (2006.01)

(52) U.S. Cl. .......................................... 137/98

(58) Field of Classification Search .............. 137/98, 137/100

See application file for complete search history.

(56) References Cited

U.S. PATENT DOCUMENTS

| | | | | |
|---|---|---|---|---|
| 3,192,939 A * | 7/1965 | Moen | ............................. | 137/100 |
| 3,348,563 A * | 10/1967 | Sidles, Jr. | ........................ | 137/101 |
| 4,926,897 A * | 5/1990 | Perrott | ............................. | 137/98 |
| 5,725,010 A * | 3/1998 | Marty et al. | .................... | 137/100 |
| 5,884,653 A * | 3/1999 | Orlandi | .......................... | 137/100 |
| 6,138,705 A * | 10/2000 | Chen | ................................ | 137/98 |
| 6,176,250 B1 * | 1/2001 | Lin et al. | ......................... | 137/98 |
| 6,267,134 B1 * | 7/2001 | Chen | ................................ | 137/98 |
| 6,412,513 B1 * | 7/2002 | Yang | ............................. | 137/100 |
| 8,267,111 B2 * | 9/2012 | Yang | ............................. | 137/100 |
| 2005/0072466 A1 * | 4/2005 | Park et al. | ....................... | 137/100 |

* cited by examiner

*Primary Examiner* — Stephen M Hepperle
*Assistant Examiner* — Frederick D Soski

(57) ABSTRACT

A temperature controlling valve contains a body including a cylindrical chamber, a first opening, a second opening, a first inflow channel, and a second inflow channel; a sleeve member retained in the chamber and including at least one first orifice and second orifice; a first cover to close the first opening; a second cover applied to close the second opening; a valve core fitted into the sleeve member, wherein the first cover includes a first projected portion with a first guide tunnel; the first guide tunnel includes a first axial flowing section and a first longitudinal flowing section; the first projected portion includes a first circular back pressure fence; the second cover includes a second projected portion with a second guide tunnel; the second guide tunnel includes a second axial flowing section and a second longitudinal flowing section; the second projected portion includes a second circular back pressure fence.

4 Claims, 8 Drawing Sheets

PRESSURE BALANCE VALVE

BACKGROUND OF THE INVENTION

1. Field of the Invention

The present invention relates to a pressure balance valve that is used to adjust a pressure between cold and hot waters automatically to balance a pressure difference.

2. Description of the Prior Art

Referring to FIG. 1, a conventional pressure balance valve 10 includes a body 11, two side covers 12 disposed on two sides thereof to define a chamber 13 with the body 11 individually; a sleeve member 14 fixed in the chamber 13; a valve core 15 fitted into the sleeve member 14 and moves along the sleeve member 14 axially and including a pressure sensing wall 151 secured on a middle section of the valve core 15, a cold-water pressure room 152 and a hot-water pressure room 153 defined in two side thereof respectively so that after cold water from a cold-water inlet 111 of the body 11 and hot water from a hot-water inlet 112 flow through the cold-water pressure room 152 and the hot-water pressure room 153, they further flow out of a cold-water outlet 113 and a hot-water outlet 114 of the body 11. Thereby, a pressure difference generates in the cold-water pressure room 152 and the hot-water pressure room 153, and the valve core 15 moves axially based on a sensed pressure of the pressure sensing wall 151 so that the cold and the hot waters in the cold-water and the hot-water pressure rooms 152, 153 are adjusted to keep a balanced water pressure, thus controlling water temperature exactly.

However, an error value within positive and negative 2 degrees Celsius can not be obtained effectively, causing an unstable water temperature.

It is because a vortex generates in the cold-water pressure room 152 and the hot-water pressure room 153, therefore after the cold and the hot waters flow into the cold-water and the hot water pressure rooms 152, 153 and when the water pressures change, the vortex generates and the valve core 15 does not move stably or does not keep a balanced pressure in a short time.

Even though the valve core 15 obtains a balanced pressure after a long period of time, the cold and the hot waters in the cold-water and the hot-water pressure rooms 152, 153 can not form an enough back pressure, so the valve core 15 does not sense the pressure difference or the pressure change precisely.

The present invention has arisen to mitigate and/or obviate the afore-described disadvantages.

SUMMARY OF THE INVENTION

The primary object of the present invention is to provide a pressure balance valve that is capable of overcoming the shortcomings of the conventional temperature controlling valve.

Further object of the present invention is to provide a pressure balance valve that a random vortex is eliminated effectively and the water is guided to flow smoothly.

Another object of the present invention is to provide a pressure balance valve that a temperature control function of the temperature controlling valve is enhanced to control an error value of the temperature control within positive and negative 2 degrees Celsius, having a comfortable shower.

Also another object of the present invention is to provide a pressure balance valve that a stable back pressure acts on the two side fences of the pressure sensing wall of the valve core, and then the valve core is located at the balanced position in a short time to obtain a stable water pressure.

A pressure balance valve in accordance with a preferred embodiment of the present invention comprises:

a body including a cylindrical chamber; a first opening disposed on one side of the chamber and a second opening fixed on another side of the chamber; a first inflow channel to flow cold water connecting with a middle section of the chamber and a second inflow channel to flow hot water communicating with the middle section of the chamber;

a sleeve member retained in the chamber and including at least one first orifice to flow the cold water coupling with the first inflow channel and at least one second orifice to flow the hot water in connection with the second inflow channel;

a first cover used to close the first opening of the body;

a second cover applied to close the second opening of the body;

a valve core fitted into the sleeve member to move axially and including a pressure sensing wall, two annular portions in connection with two peripheral sides of the pressure sensing wall individually, and a cold-water pressure room and a hot-water pressure room defined in two side fences of the pressure sensing wall and the annular portions respectively; wherein one of the annular portions includes at lease one first inlet to flow the cold water connecting with the first orifice of the sleeve member, and the other annular portion including at least one second inlet to flow the hot water connecting with the second orifice of the sleeve member and the hot-water pressure room;

characterized in that:

the first cover includes a first projected portion with a first guide tunnel extending from an inner side thereof and extending inside one of the annular portions; the first guide tunnel includes a first axial flowing section communicating with the cold-water pressure room and a first longitudinal flowing section communicating with the first outflow channel; the first projected portion includes a first circular back pressure fence formed around the first axial flowing section to be adjacent to one of the side fences of the pressure sensing wall;

the second cover includes a second projected portion with a second guide tunnel extending from an inner side thereof and extending inside the other annular portion; the second guide tunnel includes a second axial flowing section communicating with the hot-water pressure room and a second longitudinal flowing section communicating with the second outflow channel; the second projected portion includes a second circular back pressure fence formed around the second axial flowing section to be adjacent to the other side fence of the pressure sensing wall.

It is to be noted that the cold and the hot waters in the cold-water and the hot-water pressure rooms are guided to flow well by using the first and the second guide tunnels of the first and the second covers hence a random vortex in the conventional pressure balance valve is eliminated effectively. Thereby, when an inflow water pressure changes, the valve core moves toward a balanced position quickly without being interfered. Besides, the first actuated face is formed on the connection of the first axial flowing section and the first circular back pressure fence, and the second actuated face is formed on the connection of the second axial flowing section and the second circular back pressure fence to guide water to flow smoothly.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
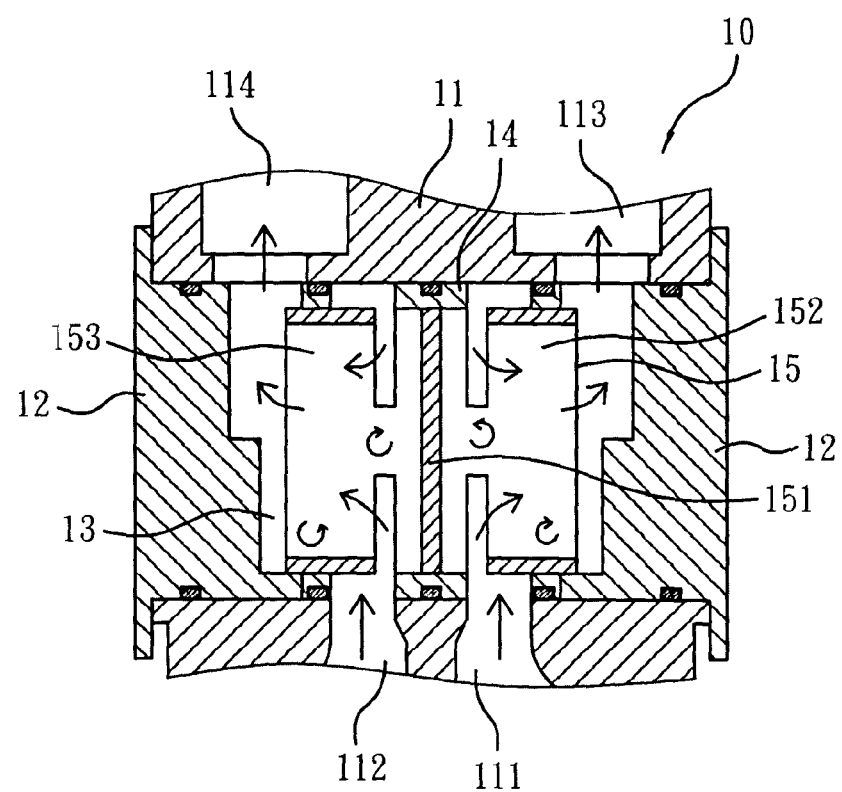
FIG. 1 is a cross sectional view showing a part of the assembly and the operation of a conventional pressure balance valve.
Figure 2:
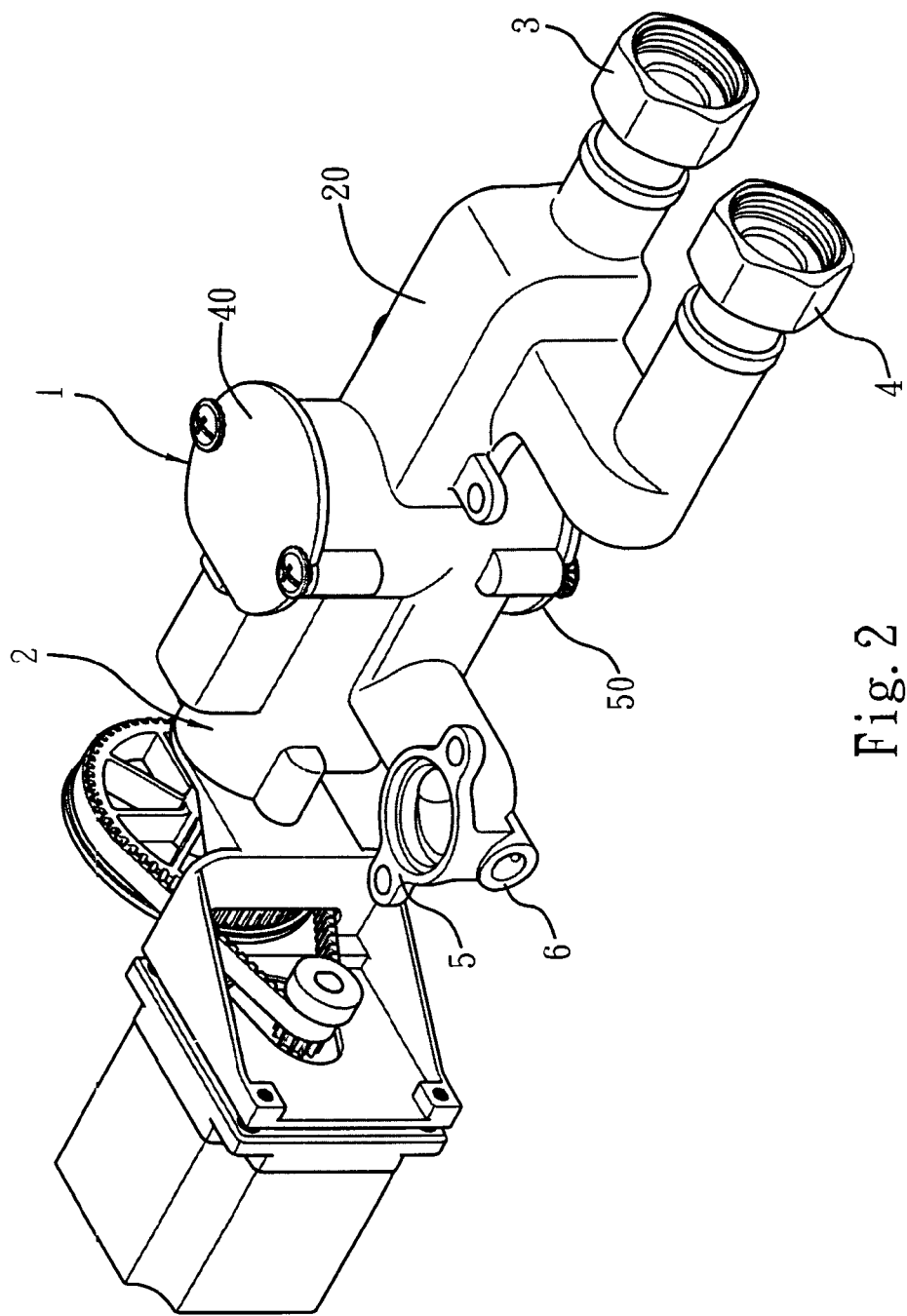
FIG. 2 is a perspective view showing a pressure balance valve according to a preferred embodiment of the present invention is installed on showering equipment.
Figure 3:
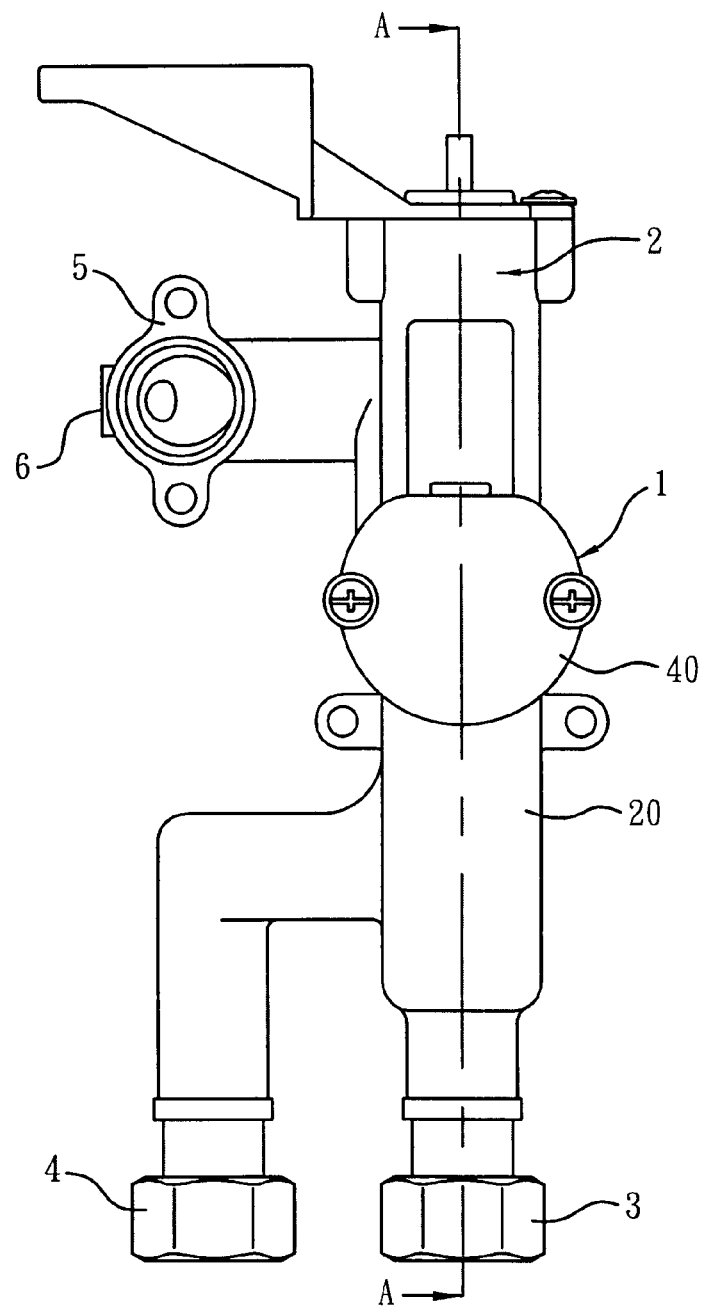
FIG. 3 is a plan view showing the pressure balance valve according to the preferred embodiment of the present invention is installed on the showering equipment.
Figure 4:
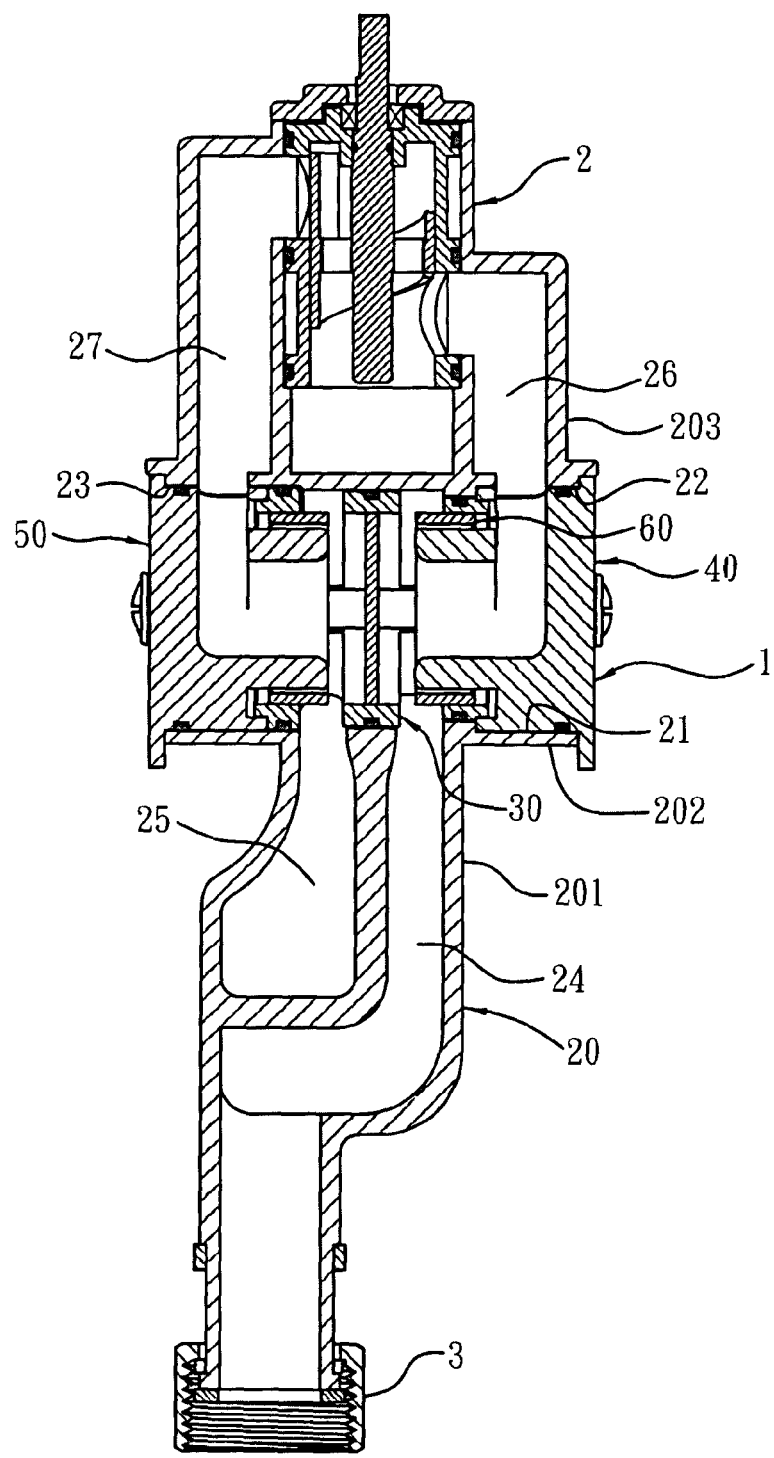
FIG. 4 is a cross sectional view taken along the line A-A of FIG. 3.

With reference to FIGS. 2-4, a pressure balance valve 1 according to a preferred embodiment of the present invention is installed on a showering equipment with a temperature controlling function, such as an inlet end of a temperature controlling valve 2; after cold and hot waters flow into the pressure balance valve 1 from a water feeding pipe via a first connector 3 to flow the cold water and via a second connector 4 to flow the hot water so that a water pressure is balanced, they are further fed into the temperature controlling valve 2 to be mixed together, and a mixed water is further fed into a specific watering device (such as a faucet or a spray shower head) from a selective first watering connector 5 or a selective second watering connector 6 on a basis of a set requirement, thereby supplying water in a shower.

The pressure balance valve 1 includes a body 20, a sleeve member 30, a first cover 40, a second cover 50, and a valve core 60.

Figure 5:
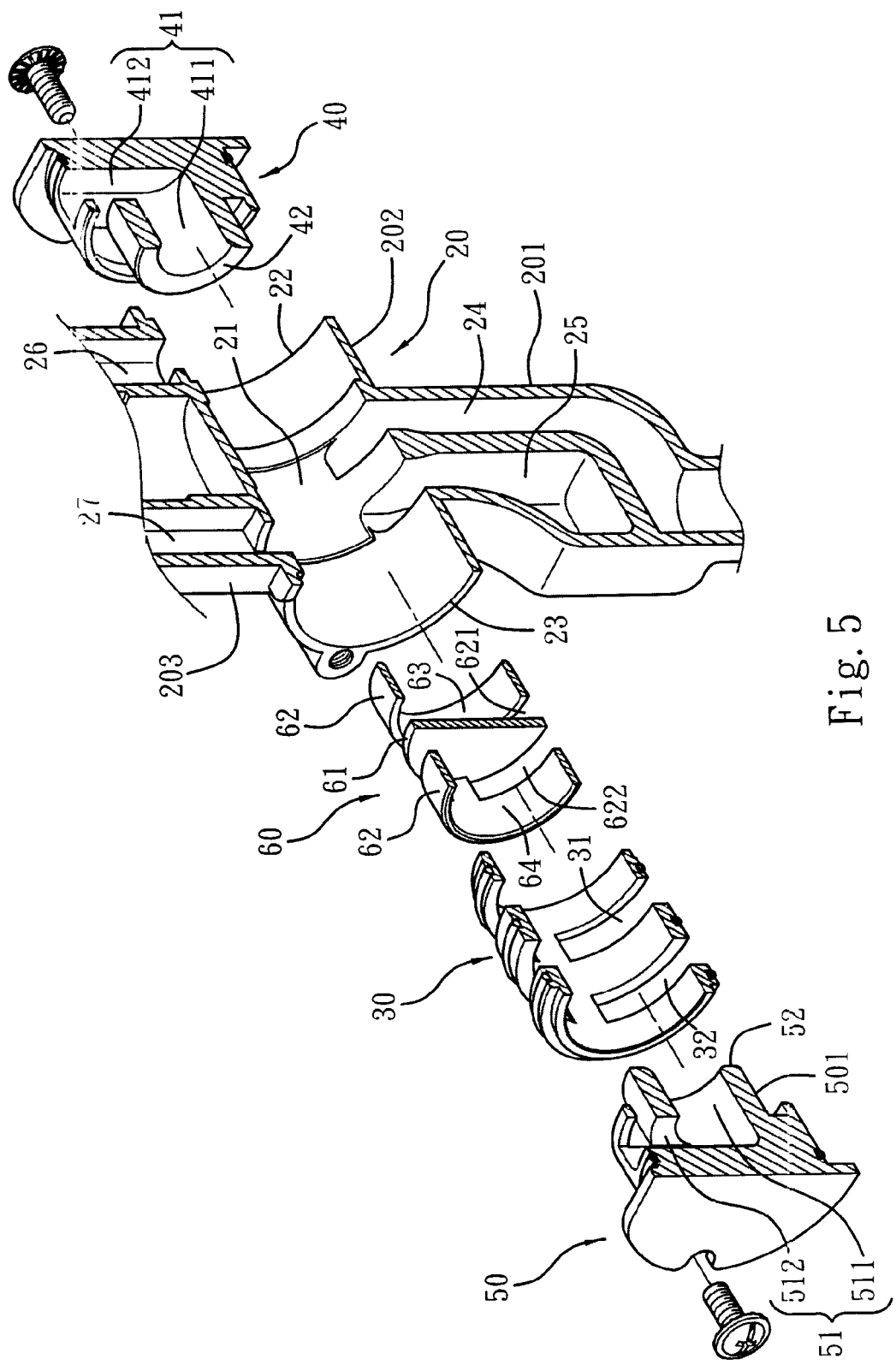
FIG. 5 is a perspective view showing the exploded components of the pressure balance valve according to the preferred embodiment of the present invention.

The body 20, as shown in FIGS. 4 and 5, includes a cylindrical chamber 21; a first opening 22 disposed on one side of the chamber 21 and a second opening 23 fixed on another side of the chamber 21; a first inflow channel 24 to flow the cold water connecting with a middle section of the chamber 21 and a second inflow channel 25 to flow the hot water communicating with the middle section of the chamber 21 as well, such that the cold water from the first connector 3 and the hot water from the second connector 4 are guided to flow into the chamber 21; a first outflow channel 26 to flow the cold water connecting with one side of the middle section of the chamber 21 and a second outflow channel 27 to flow another side of the middle section of the chamber 21, such that the cold and the hot waters from the chamber 21 are guided to flow into the temperature controlling valve 2 to be mixed together.

The body 20 also includes an inlet portion 201, a casing portion 202, and an outlet portion 203, all of which are integrally connected together; the inlet portion 201 is used to form the first inflow channel 24 and the second inflow channel 25; the casing portion 202 is applied to form the chamber 21; and the outlet portion 203 is severed to form the first outflow channel 26 and the second outflow channel 27 and is integrally coupled with the temperature controlling valve 2.

The first inflow channel 24 and the second inflow channel 25 are disposed on an inlet end of the chamber 21, and the first outflow channel 26 and the second outflow channel 27 are fixed on an outlet end of the chamber 21, the inlet and the outlet ends are located at the middle section of the chamber 21.

Figure 6:
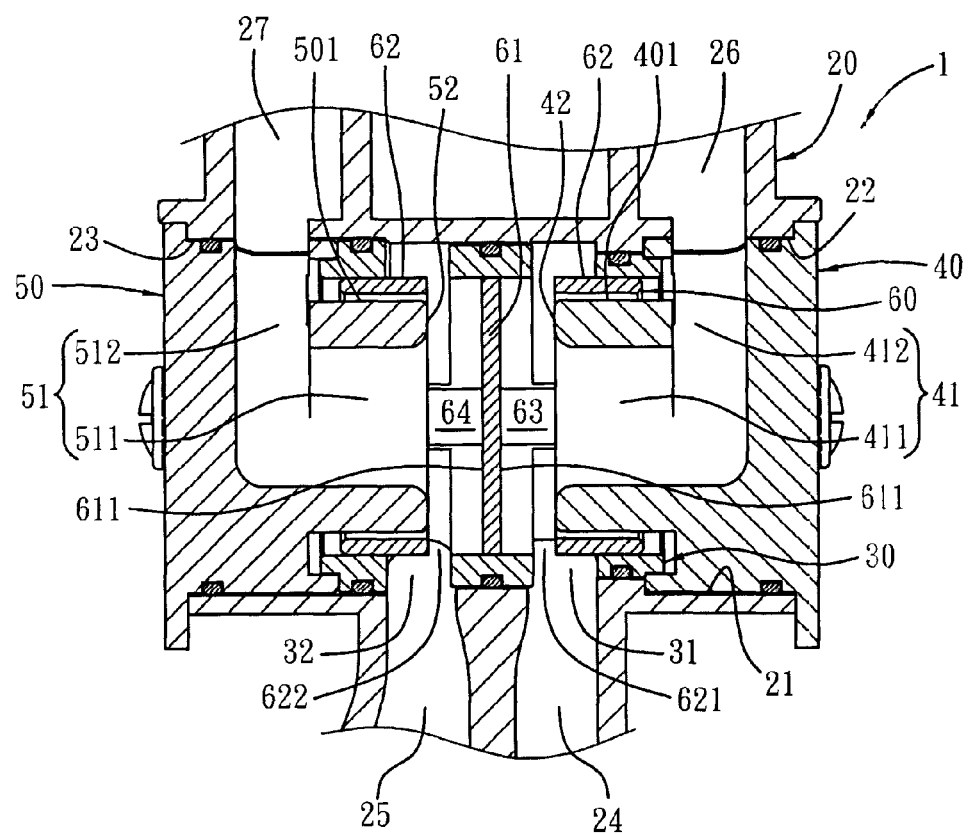
FIG. 6 is a cross sectional view showing the assembly of the pressure balance valve according to the preferred embodiment of the present invention.

The sleeve member 30, as illustrated in FIGS. 5 and 6, is tightly retained in the chamber 21 and includes two first orifices 31 to flow the cold water coupling with the first inflow channel 24 and two second orifices 32 to flow the hot water in connection with the second inflow channel 25.

Figure 7:
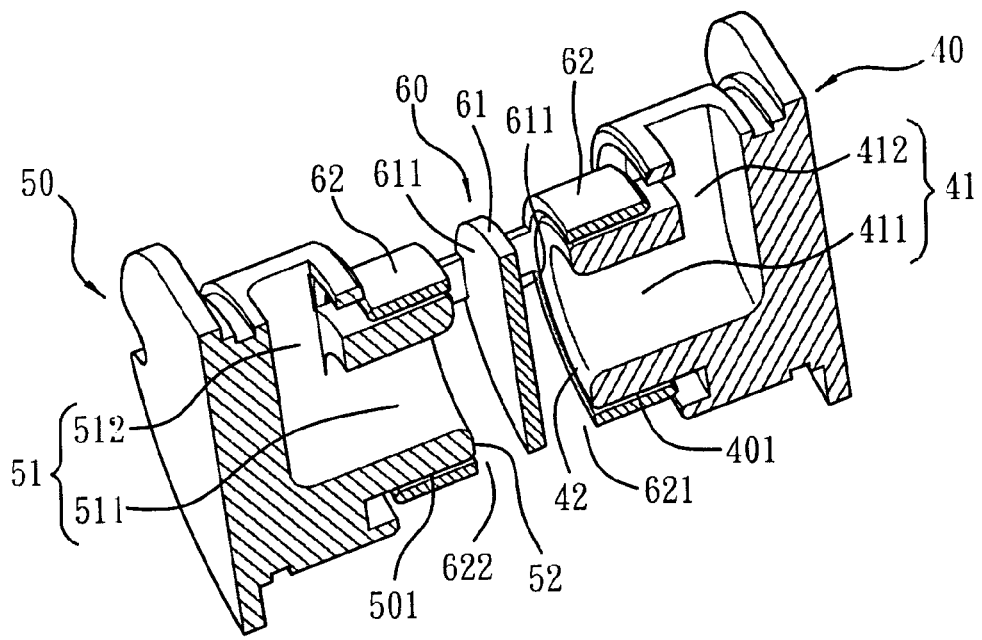
FIG. 7 is a cross-sectional perspective view showing the assembly of a valve core, a first cover, and a second cover of the pressure balance valve according to the preferred embodiment of the present invention.
Figure 8:
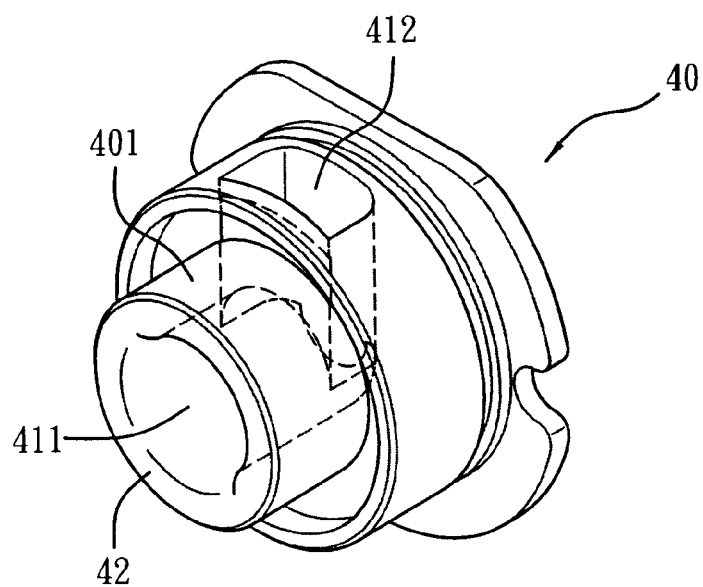
FIG. 8 is a perspective view showing the assembly of the first cover of the pressure balance valve according to the preferred embodiment of the present invention.

The first cover 40, as shown in FIGS. 7 and 8, is used to close the first opening 22 of the body 20.

The second cover 50 is applied to close the second opening 23 of the body 20.

The valve core 60 is fitted into the sleeve member 30 to move axially and includes a pressure sensing wall 61, two annular portions 62 in connection with two peripheral sides of the pressure sensing wall 61 individually, and a cold-water pressure room 63 and a hot-water pressure room 64 defined in two side fences 611 of the pressure sensing wall 61 and the annular portions 62 respectively; wherein one of the annular portions 62 includes at lease one first inlet 621 to flow the cold water connecting with the first orifice 31 of the sleeve member 30, and the other annular portion 62 includes at least one second inlet 622 to flow the hot water connecting with the second orifice 32 of the sleeve member 30 and the hot-water pressure room 64. There are two first inlets 621 and two second inlets 622 provided in this embodiment.

An improvement of the pressure balance valve 1 of the present invention contains:

the first cover 40, as illustrated in FIGS. 6-8, includes a first projected portion 401 with a first guide tunnel 41 extending from an inner side thereof and extending inside one of the annular portions 62; the first guide tunnel 41 having a first axial flowing section 411 communicating with the cold-water pressure room 63 and a first longitudinal flowing section 412 communicating with the first outflow channel 26; wherein the first projected portion 401 includes a first circular back pressure fence 42 formed around the first axial flowing section 411 to be adjacent to one of the side fences 611 of the pressure sensing wall 61; wherein on a connection of the first axial flowing section 411 and the first circular back pressure fence 42 is formed a first actuate face;

the second cover 50 including a second projected portion 501 with a second guide tunnel 51 extending from an inner side thereof and extending inside the other annular portion 62; the second guide tunnel 51 including a second axial flowing section 511 communicating with the hot-water pressure room 64 and a second longitudinal flowing section 512 communicating with the second outflow channel 27; the second projected portion 501 including a second circular back pressure fence 52 formed around the second axial flowing section 511 to be adjacent to the other side fence 611 of the pressure sensing wall 61; wherein on a connection of the second axial flowing section 511 and the second circular back pressure fence 52 is formed a second actuate face.

The first cover 40 is formed to be symmetrical to the second cover 50, therefore the second cover 50 is formed in the same profile of the first cover 40 as illustrated in FIG. 8.

Figure 9:
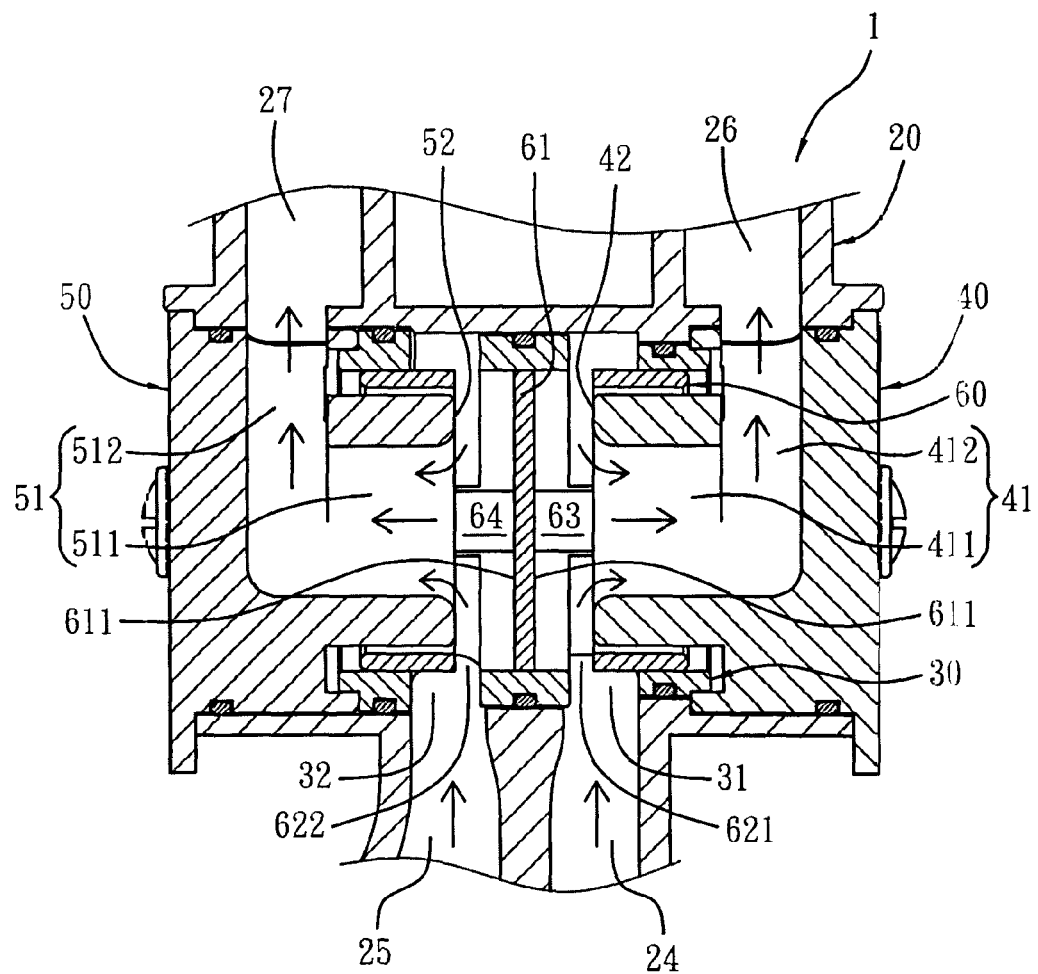
FIG. 9 is a cross sectional view showing the operation of the pressure balance valve according to the preferred embodiment of the present invention.

It is preferable that the first circular back pressure fence 42 of the first cover 40 axially flushes with a side surface of the first inlet 621 where the valve core 60 is located, and the second circular back pressure fence 52 of the second cover 50 axially flushes with a side surface of the second inlet 622 where the valve core 60 is located such that after the cold water from the first orifices 31 and the hot water from the second orifices 32 flow into the cold-water pressure room 63 and the hot-water pressure room 64 via the first inlet 621 and the second inlet 622 respectively, they act with the first and second circular back pressure fences 42, 52 to generate enough back pressure relative to the side fences 611 of the pressure sensing wall 61 and to be guided to flow into the first and the second guide tunnels 41, 51 as illustrated in FIG. 9 to stabilize the back pressure. It is to be noted that the first and second circular back pressure fences 42, 52 are arranged axially on the first and second covers 40, 50 so that when the valve core 60 is located at a middle position or moved away from the middle position, the first and the second projected portions 401, 501 will not extend into the annular portions 62 overly because of their longer axial lengths to stop the cold and the hot waters from the first and the second inlets 621, 622 flowing into the cold-water and the hot-water pressure rooms 63, 64; on the contrary, when the axial lengths of the first and the second projected portions 401, 501 is short, a stepped groove will not generate between the first and second circular back pressure fences 42, 52 and the annular portions 62 of the first and the second inlets 621, 622 to obstruct the cold and the hot waters.

With reference to FIG. 9, the cold and the hot waters from the first and the second inflow channels 24, 25 of the body 20 flows into the first and the second inlets 621, 622 of the valve core 60 via the first and the second orifices 31, 32 of the sleeve member 30 to be received by the cold-water and the hot-water pressure rooms 63, 64 of the valve core 60. Thereafter, the cold and the hot waters from the first and the second guide tunnels 41, 51 flows into the temperature controlling valve 2 to be mixed together via the first and second outflow channels 26, 27; wherein when the cold and the hot waters flow into the cold-water and the hot-water pressure rooms 63, 64 to generate a pressure difference between cold-water and the hot-water pressures, the two side fences 611 of the pressure sensing wall 61 sense the pressure difference to force the valve core 60 to move axially so that water pressures in the cold-water and the hot-water pressure rooms 63, 64 keep balanced.

It is to be noted that the cold and the hot waters in the cold-water and the hot-water pressure rooms 63, 64 are guided to flow well by using the first and the second guide tunnels 41, 51 of the first and the second covers 40, 50, hence a random vortex in the conventional pressure balance valve is eliminated effectively. Thereby, when an inflow water pressure changes, the valve core 60 moves toward a balanced position quickly without being interfered. Besides, the first actuated face is formed on the connection of the first axial flowing section 411 and the first circular back pressure fence 42, and the second actuated face is formed on the connection of the second axial flowing section 511 and the second circular back pressure fence 52 to guide water to flow smoothly.

The cold and the hot waters in the cold-water and the hot-water pressure rooms 63, 64 generate the enough back pressures on the two side fences 611 of the pressure sensing wall 61 by ways of the first and second circular back pressure fences 42, 52 so that the pressure sensing wall 61 senses a change of the water pressure in the cold-water and the hot-water pressure rooms 63, 64 to make the valve core 60 move toward the balanced position.

Thereby, a temperature control function of the temperature controlling valve 2 is enhanced to control an error value of the temperature control within positive and negative 2 degrees Celsius, having a comfortable shower.

To prove the pressure balance valve of the present invention can obtain a pressure balance in a short time, a Fluid and Solid Interaction is used to analyze a mold flow of the conventional pressure balance valve and the pressure balance valve 1 of the present invention so that fluid in the cold-water and the hot-water pressure rooms of the conventional pressure balance valve and the cold and the hot waters in the cold-water and the hot-water pressure rooms 63, 64 are shown individually. Also, a movement of the valve core 60 is shown as well.

As shown in Appendix 1, a vertical axis represents a velocity of a displacement of the valve core, and a unit of the velocity of the displacement of the valve core is cm/sec, a horizontal axis denotes a time of the displacement of the valve core, and a unit of the displacement of the valve core is sec, a curve line 1 represents the conventional pressure balance valve, and a curve line 2 denotes the pressure balance valve 1 of the present invention. After the cold and the hot water pressures are changed for 0.25 sec, the conventional pressure balance valve is not in a balanced state, due to a larger vortex space is formed in the cold-water and the hot-water pressure rooms 63, 64, the random vortex generates after the cold and the hot waters flow into the cold-water and the hot-water pressure rooms 63, 64 respectively, and then the vortex acts on the two side fences 611 of the pressure sensing wall 61, hence the valve core 60 moves to influence a stability of the water temperature.

However, after the cold and the hot water pressures are changed for 0.075 sec, the pressure balance valve 1 of the present invention is in a balanced state by using a flow guiding and back pressure structure so that a stable back pressure acts on the two side fences 611 of the pressure sensing wall 61 of the valve core 60, and then the valve core 60 is located at the balanced position in a short time to obtain a stable water pressure.

To achieve enough back pressure and flow amount for the cold and the hot waters in the cold-water and the hot-water pressure rooms 63, 64, an area of the first and the second circular back pressure fences 42, 52 is limited based on a size of the pressure balance valve.

Furthermore, an experiment of the pressure balance valve of the present invention is executed, wherein an outer diameter of the first and the second circular back pressure fences 42, 52 is set as a fixed parameter, and a minimum value of a bore diameter D of the first and the second longitudinal flowing sections 412, 512 is limited to comply with a limitation of a basis flow amount. As shown in Appendix 2, the outer diameter of the first and second circular back pressure fences 42, 52 is set as 25 mm, and a 11 mm of bore diameter of the first and the second longitudinal flowing sections 412, 512 is eliminated, accordingly the bore diameter D is set within 11-15 mm, and a cold-water and hot-water inflow pressure P is tested by increasing or decreasing 50% pressure at one time, wherein when the bore diameter D is within 11-14 mm and the cold-water and hot-water inflow pressure P is increased or decreased, the pressure balance valve 1 is capable of controlling the water pressure within positive and negative 2 degrees Celsius, but when the bore diameter D is 15 mm and the cold-water and hot-water inflow pressure P is increased or decreased, the water temperature is over positive and negative 2 degrees Celsius. Therefore, when the bore diameter D of the first and the second longitudinal flowing sections 412, 512 is large excessively, the area of the first and the second circular back pressure fences 42, 52 become small to lower the back pressure effect of the two side fences 611 of the pressure sensing wall 61, so a pressure variation is not sensed, and the valve core does not move exactly, lowering pressure balance.

It is to be noted that the area of the first circular back pressure fences 42 and a cross sectional area to flow water in the first axial flowing section 411 is in a certain ratio. For example, the ratio of the area of the first circular back pressure fences 42 and the cross sectional area to flow water in the first axial flowing section 411 is 2 to 4. Likewise, a preferred ratio of the area of the second circular back pressure fences 52 and a cross sectional area to flow water in the second axial flowing section 511 is 2 to 4 as well.

While we have shown and described various embodiments in accordance with the present invention, it is clear to those skilled in the art that further embodiments may be made without departing from the scope of the present invention.

What is claimed is:

1. A pressure balance valve comprising
   a body including a cylindrical chamber; a first opening disposed on one side of the chamber and a second opening fixed on another side of the chamber; a first inflow channel to flow cold water connecting with a middle section of the chamber and a second inflow channel to flow hot water communicating with the middle section of the chamber;
   a sleeve member retained in the chamber and including at least one first orifice to flow the cold water coupling with the first inflow channel and at least one second orifice to flow the hot water in connection with the second inflow channel;
   a first cover used to close the first opening of the body;
   a second cover applied to close the second opening of the body;
   a valve core fitted into the sleeve member to move axially and including a pressure sensing wall, two annular portions in connection with two peripheral sides of the pressure sensing wall individually, and a cold-water pressure room and a hot-water pressure room defined in two side fences of the pressure sensing wall and the annular portions respectively; wherein one of the annular portions includes at least one first inlet to flow the cold water connecting with the first orifice of the sleeve member, and the other annular portion including at least one second inlet to flow the hot water connecting with the second orifice of the sleeve member and the hot-water pressure room;
   characterized in that:
   the first cover includes a first projected portion with a first guide tunnel extending from an inner side thereof and extending inside one of the annular portions; the first guide tunnel includes a first axial flowing section communicating with the cold-water pressure room and a first longitudinal flowing section communicating with the first outflow channel; the first projected portion includes a first circular back pressure fence formed around the first axial flowing section to be adjacent to one of the side fences of the pressure sensing wall;
   the second cover includes a second projected portion with a second guide tunnel extending from an inner side thereof and extending inside the other annular portion; the second guide tunnel includes a second axial flowing section communicating with the hot-water pressure room and a second longitudinal flowing section communicating with the second outflow channel; the second projected portion includes a second circular back pressure fence formed around the second axial flowing section to be adjacent to the other side fence of the pressure sensing wall.

2. The pressure balance valve as claimed in claim 1, wherein the first circular back pressure fence of the first cover axially flushes with a side surface of the first inlet of the valve core; and the second circular back pressure fence of the second cover axially flushes with a side surface of the second inlet where the valve core is located.

3. The pressure balance valve as claimed in claim 1, wherein a ratio of an area of the first circular back pressure fences and a cross sectional area to flow water in the first axial flowing section is 2 to 4, and a ratio of an area of the second circular back pressure fences and a cross sectional area to flow water in the second axial flowing section is 2 to 4.

4. The pressure balance valve as claimed in claim 1, wherein on a connection of the first axial flowing section and the first circular back pressure fence is formed a first actuate face; and on a connection of the second axial flowing section and the second circular back pressure fence is formed a second actuate face.

* * * * *